United States Patent Office 3,245,925
Patented Apr. 12, 1966

3,245,925
COATING COMPOSITION CONTAINING POLY-
EPOXIDE, PHENOLIC, ACRYLIC AND POLY-
ESTER RESINS
Edwin A. Watson, Florham Park, N.J., assignor to Pittsburgh Plate Glass Company, Pittsburgh, Pa., a corporation of Pennsylvania
No Drawing. Filed June 20, 1963, Ser. No. 289,442
16 Claims. (Cl. 260—20)

This invention relates to coating compositions comprising a blend of several components including a polyester having unreacted epoxy groups in the polyester molecule.

Many materials having otherwise desirable properties cannot be successfully employed as coatings in certain applications because of their relatively poor adhesion to the substrate involved. This is especially true when the coated substrate is to be subjected to distortion or rapid changes in temperature during processing or use. Such materials as polyethylene and plastisols, i.e., dispersions of polyvinyl halides in plasticizers, are particularly susceptible to such deficiencies when utilized as coatings, for example, in bottle caps and similar articles which require fabrication steps prior to use.

When such deficiencies are apparent, primer coatings are often employed. However, it is difficult to achieve a primer having suitable properties and which adheres satisfactorily to both the substrate and the finish coating. In the case of plastisols, suitable primers have recently been found which provide satisfactory results when employed over various substrates. These primers comprise a mixture of an epoxy resin, a phenol-formaldehyde resin and a methyl methacrylate polymer, and are described in United States Patent No. 3,011,909. An improved primer composition for plastisols is described in copending application Serial No. 165,939, filed January 12, 1962. However, even these primers, which are among the most desirable yet developed for this purpose, are not completely satisfactory. For example, when employed in applications involving very severe stresses during fabrication it is necessary to employ a size coating under the primers in order to achieve consistently satisfactory results. The size coating is a thin, very flexible, clear coating which improves the adhesion of the primer to the base metal.

It has now been found that improved properties are attained by coating compositions comprising four essential components as described herein. These coating compositions, when employed as primers under plastisols, eliminate the need for a size coating because of their excellent adhesion to metal and other substrates and their high degree of flexibility. In addition, they have suitable adhesion to the plastisols, especially so when utilized under certain of the commercially available plastisols extensively used as coatings.

The compositions of this invention, while advantageously utilized as primers for plastisols, are not limited to use in this manner. Thus, for example, they can be employed as a coating without a finish coat. They are also very desirable as primer coatings under polyethylene. The use of polyethylene as a coating generally requires an adhesive material to bond the polyethylene to the substrate, and thus it is necessary for a primer to be employed in such systems to have good adhesion to both the substrate and the adhesive. Ordinary primers, including the primers of United States Patent No. 3,011,909, are not satisfactory in this respect, whereas the compositions described herein when used as a primer provide polyethylene coating systems of outstanding properties.

As indicated above, the improved coating compositions of this invention are comprised of four essential components. These components are (1) a polyepoxide or a monocarboxylic acid ester of a polyepoxide, (2) a heat-reactive phenol-aldehyde resin, (3) a polymer of an alkyl methacrylate, and (4) a polyester containing unreacted epoxy groups in the polyester molecule.

The proportions of the various components can be varied widely. The polyester component should ordinarily be present in an amount between about 10 and about 50 percent and preferably between about 20 and about 40 percent based on the total composition (all parts and percentages herein are by weight and are based upon the nonvolatile solids content unless otherwise specified). The proportions of the other components are less important, provided that each is present in an appreciable amount. In most instances the polymer of an alkyl methacrylate is used in amounts between about 30 and about 75 percent based on the total composition, and the remainder is the phenol-aldehyde resin and the polyepoxide or polyepoxide ester. The phenol-aldehyde resin is usually about 10 to about 60 percent of the combined weight of the phenol-aldehyde resin and the polyepoxide or ester thereof.

The polyepoxide can be any epoxide compound or mixture which has a 1,2-epoxy equivalency of greater than 1.0, that is, in which the average number of 1,2-epoxy groups per molecule is greater than 1. The average number of epoxy groups may be a fractional number and in general is less than 4.0. These polyepoxides comprise a relatively large class of materials and have been described in numerous patents. Some of these patents are United States Patents Nos. 2,467,171; 2,615,007; 2,716,123; 3,030,336; 3,053,855; and 3,075,999.

Among the polyepoxides which can be used herein are the polyglycidyl ethers of polyphenols, such as Bisphenol A [2 - 2 - bis(4-hydroxyphenyl)propane]. These may be attained, for example, by etherification of a polyphenol with epichlorohydrin or dichlorohydrin in the presence of an alkali. The phenolic compound may be bis(4-hydroxyphenyl)2,2-propane, 4,4'-dihydroxybenzophenone, bis(4 - hydroxyphenyl)1,1 - ethane, bis(4 - hydroxyphenyl)1,1-isobutane, bis(4-hydroxyphenyl)2,2-propane, bis(4-hydroxytertiary butyl phenyl)2,2-propane, bis(2 - hydroxynaphthyl)methane, 1,5-dihydroxynaphthalene, or the like. The polyphenol can also be a novolak resin or a similar polyphenol resin.

Such polyglycidyl ethers of polyphenols are generally preferred and correspond to the average formula:

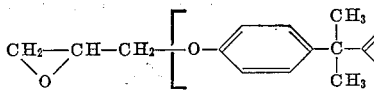

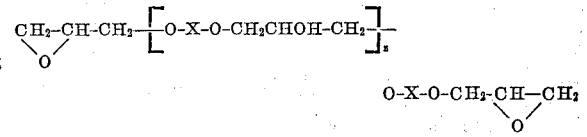

in which X represents an aromatic radical, and z represents a whole or fractional small number.

Especially preferred are the reaction products of Bisphenol A and epichlorohydrin, which correspond to the structure:

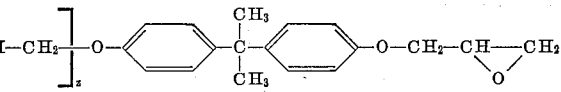

in which z represents a whole or fractional small number.

Also suitable are the similar polygylcidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, and the like.

Also suitable are polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,6-naphthylene dicarboxylic acid, dimerized linolenic acid, and the like. Examples af diglycidyl adipate and diglycidyl phthalate, and similar esters which correspond to the formula:

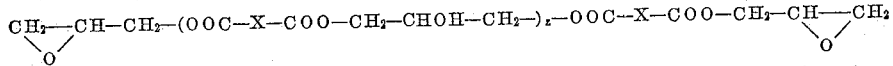

in which X represents a hydrocarbon radical, such as a phenyl or other aromatic radical or an aliphatic radical, and z represents a whole or fractional small number.

Another class of polyepoxides which can be employed herein are the 1,2-epoxy resins made by epoxidation of olefinically unsaturated compounds, and especially those produced by epoxidation of olefinically unsaturated alicyclic compounds. An example of the epoxidized alicyclic compounds are the epoxy alicyclic esters, such as

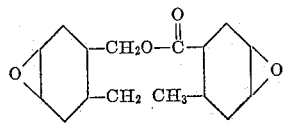

and

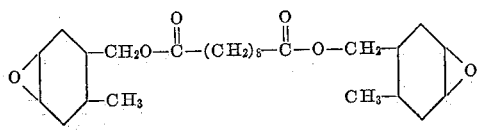

These can be prepared by condensing a cyclic unsaturated aldehyde to form an unsaturated condensate which is then epoxidized with a peracid. Other examples of this type of polyepoxide are the similar alicyclic ethers which can be produced by the epoxidation of dicyclopentadiene.

In addition to the polyepoxides from the epoxidation of unsaturated alicyclic compounds, usable polyepoxides are obtained by the epoxidation of olefinically unsaturated aliphatic compounds, such as fatty acids or fatty acid esters. The well-known epoxidized oils are examples of this type of polyepoxide.

In place of all or part of the polyepoxide described above, there may be employed a monocarboxylic acid ester thereof in which all or some of the epoxy groups in the polyepoxide are esterified by reaction with a monocarboxylic acid. It is especially advantageous to employ the polyepoxide esters of fatty acids, such as tall oil fatty acids or the fatty acids derived from oils such as linseed oil, soybean oil, safflower oil, perilla oil, tung oil, sunflower oil, dehydrated castor oil, fish oils, and the like. However, other monocarboxylic acids, such as benzoic acid and other aliphatic and aromatic acids having at least 2 and preferably not more than about 24 carbon atoms, can also be employed if desired.

These esters are ordinarily only partially esterified, that is, not all of the epoxy and hydroxyl groups of the epoxy resin are reacted. The esterification of the polyepoxide is carried out by refluxing the polyepoxide in the presence of one or more of the monocarboxylic acids while simultaneously removing the water of reaction. One example of such an ester which has been found to be advangeously utilized in the invention has the following composition:

*Example A*

| | Parts by weight |
|---|---|
| Polyepoxide from the reaction of Bisphenol A with epichlorohydrin having an average molecular weight of 2900 and an epoxide equivalent of 1650 to 2050 (Epon 1007) | 30.0 |
| Tall oil fatty acids (Aconew Extra) | 2.4 |

The heat-reactive phenol-aldehyde resin can be any of those resins of this type which are commonly known and used in the art. The choice of particular reactants, reactant ratios, catalysts and polymerization conditions to achieve phenol-aldehyde condensation products having these properties are well known and any such phenolic resin can be employed herein. The chief characteristic of these heat-reactive resins is that the condensation reaction has not progressed to the final nonreactive thermoset state, and thus the resins are capable when heated of further polymerization.

In these resins, a phenol is condensed with an aldehyde which is most often formaldehyde, although other aldehydes such as acetaldehyde can also be employed. Methylene-releasing and aldehyde-releasing agents, such paraformaldehyde and hexamethylenetetramine, can be utilized as the aldehyde reagent if desired. The phenol can be phenol per se, cresol, or a substituted phenol in which a hydrocarbon radical, having either a straight chain, a branched chain or a cyclic structure, is substituted for a hydrogen in the aromatic ring. Some examples of phenols thus employed include paraphenyl phenol, paratertiary amyl phenol, paratertiary butyl phenol, cyclopentyl phenols, and unsaturated hydrocarbon-substituted phenols, such as the monobutenyl phenols containing a butenyl group in ortho, meta or para position and where the double bond occurs in various positions in the hydrocarbon chain.

Another essential component is a polymer of an alkyl methacrylate. These polymers are made up entirely or predominantly of an alkyl methacrylate. Various alkyl methacrylates can be employed to produce these polymers, including such monomers as methyl methacrylate, which is generally preferred, ethyl methacrylate, propyl methacrylate, butyl methacrylate, 2-ethyl hexyl methacrylate, cyclohexyl methacrylate, and other alkyl methacrylates having up to about 8 carbon atoms in the alkyl chain. While homopolymers of these alkyl methacrylates can be employed, in certain instances it is preferred to use copolymers or interpolymers in which the alkyl methacrylate is copolymerized with one or more other copolymerizable ethylenically unsaturated monomers. Among the comonomers which may be used are higher alkyl methacrylates, such as lauryl methacrylate, and other esters of carboxylic acids containing ethylenic unsaturation. These may be carboxylic acid esters of unsaturated alcohols, for example, vinyl acetate, vinyl propionate, vinyl butyrate and vinyl succinate, or they may be a saturated alcohol ester of an unsaturated carboxylic acid, for example, the methyl, ethyl, propyl, butyl and amyl esters of acrylic acid, ethacrylic acid and similar acids. There may also be employed as comonomers styrene, vinyl toluene, butadiene, acrylonitrile and similar ethylenically unsaturated compounds, preferably containing a $CH_2=C<$ group.

In certain instances, it is especially desirable to employ as the polymer of an alkyl methacrylate, interpolymers of the alkyl methacrylate with minor amounts, e.g., 2 to 40 percent, of a vinyl monomer of the structure:

$$CH_2-CZ \atop |R$$

wherein R is hydrogen or a lower alkyl radical and Z is selected from the group consisting of

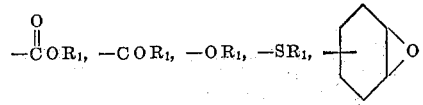

and

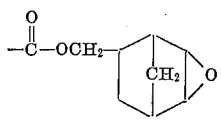

radicals $R_1$ being a radical derived by removing a hydroxyl group from a polyol (including polyols such as hydroxyl-containing epoxy compounds) having from 2 to 6 hydroxyl groups, or a radical derived by the removal of the halogen from a halogen-substituted aliphatic epoxide, such as an epihalohydrin.

Typical of the preferred comonomers which are defined by the above formula are glycidyl methacrylate, beta-hydroxyethyl methacrylate, glycerol alpha-allyl ether, hydroxyethyl vinyl sulfide, 2-vinyl thioethyl glycidyl ether, vinyl cyclohexene monoxide, the epoxidized reaction product of cyclopentadiene and allyl alcohol (Cyclol) which has been esterified with an alpha, beta-unsaturated carboxylic acid, preferably a monocarboxylic acid, and beta-hydroxyethyl vinyl ether.

In each instance, the major proportion of the polymer of an alkyl methacrylate is the alkyl methacrylate itself. The choice of comonomers in large part depends on the use intended for the coating composition. Thus, for example, when the composition is to be a primer under a plastisol, copolymers of an alkyl methacrylate with a monomer of the formula set forth above are preferred. When the material is to be used as a coating per se, homopolymers of the alkyl methacrylate or copolymers with monomers such as styrene or vinyl toluene may be employed.

The polymer of an alkyl methacrylate is produced by conventional techniques, using a suitable solvent or suspension medium and, ordinarily, a free-radical catalyst such as benzoyl peroxide. Some examples of methacrylate polymers which may be employed are as follows:

*Example B*

| | Weight percent |
|---|---|
| Methylmethacrylate | 90 |
| Glycidyl methacrylate | 10 |

*Example C*

| | |
|---|---|
| Methyl methacrylate | 80 |
| Vinyl butyrate | 20 |

*Example D*

| | |
|---|---|
| Methyl methacrylate | 80 |
| Dibutyl itaconate | 20 |

*Example E*

| | |
|---|---|
| Methyl methacrylate | 95 |
| Methacrylic acid | 5 |

*Example F*

| | |
|---|---|
| Methyl methacrylate | 90 |
| Hydroxyethyl vinyl ether | 10 |

*Example G*

| | |
|---|---|
| Methyl methacrylate | 90 |
| Hydroxyethyl vinyl sulfide | 10 |

The fourth essential component is a polyester containing unreacted epoxy groups in the polyester molecules. These are obtained by reacting a polyepoxide with a preformed esterification product of a polyhydric alcohol and a polycarboxylic acid, using at least about 1 mole of the polyepoxide per unreacted carboxyl equivalent in the preformed esterification product. The resulting polyester contains unreacted epoxy groups and provides many of the desirable properties which make the coating compositions herein uniquely valuable.

The preformed esterification products employed in producing the epoxy-containing polyesters are substantially linear polymeric esters of a polycarboxylic acid and a polyhydric alcohol. In place of the polycarboxylic acid, there may be employed the corresponding anhydride of those acids which form anhydrides, and throughout this specification the use of the term "polycarboxylic acids" is considered to include such anhydrides. In general, these esterification products have sufficient unreacted carboxyl groups so that they have an acid number of at least about 5. Acid number, as that term is used herein, is defined as the milligrams of potassium hydroxide required to neutralize 1 gram of sample.

The esterification product may be saturated or unsaturated and may be produced from various polycarboxylic acids. Among the acids which may be employed are adipic acid, succinic acid, phthalic acid, isophthalic acid, terephthalic acid, diglycolic acid, oxalic acid, sebacic acid, azaleic acid, malic acid, glutaric acid, diphenic acid, maleic acid, fumaric acid, chlorendic acid, tetrachlorophthalic acid, and similar polycarboxylic acids of varying types. The esterification product may also include in addition to the polycarboxylic acid, minor proportions of one or more monobasic acids, for example, benzoic acid or the various fatty acids, such as oleic acid linoleic acid, linolenic acid, palmitic acid and stearic acid.

Similarly, the preformed ester can be an oil-modified resin, such as the well-known oil-modified alkyds, containing such oils as coconut oil, soybean oil, linseed oil, and the like. Also, the esterification product may include other copolymerized monomers, such as esters of acrylic acid and methacrylic acid, acrylonitrile, olefinic hydrocarbons, or other polymerizable ethylenically unsaturated monomers.

Essentially any polyhydric alcohol can be utilized in producing the preformed esterification products herein, provided that the ratio of the alcohol and the polycarboxylic acid and the reaction conditions are chosen so as to produce an esterification product having unreacted carboxyl groups and which is ungelled and substantially linear. Among the polyhydric alcohols ordinarily employed are such polyols as ethylene glycol, propylene glycol, diethylene glycol, dipropylene glycol, triethylene glycol, neopentyl glycol, 1,4-butanediol, 1,5-pentanediol, trimethylene glycol, polyethylene glycol, trimethylolethane, trimethylolpropane, glycerol, 1,2,6-hexanetriol, pentaerythritol, sorbitol, methyl glucoside, mannitol, and similar polyols having a plurality (e.g., up to about 6) of hydroxyl groups.

The preformed esterification product is produced by conventional techniques ordinarily employed in making polyesters of the types described. Either fusion or solvent processes may be employed. The reaction is carried out using ratios of reactants and/or reaction times so as to result in a product having unreacted carboxyl groups derived from the carboxylic acid or acids utilized, as shown by the acid number of the product. It may be noted that if a catalyst is employed, it is best to avoid Lewis acid catalysts and similar catalysts which may later promote etherification between the polyepoxide and any residual hydroxyl groups in the esterification product.

The epoxy-containing polyester is produced by reacting the preformed esterification products as described above with a polyepoxide. In general, any of the above-described types of polyepoxides having an epoxy equivalence of greater than 1.0 can be employed, including, for example, glycidyl ethers of polyhydric compounds, such as the reaction products of a polyphenol or a polyol and epichlorohydrin, and the polyglycidyl esters of polycarboxylic acids. For certain purposes, however, epoxy-containing polyesters produced from 1,2-epoxy resins made by epoxidation of olefinic unsaturated compounds, and especially alicyclic compounds, are preferred. Diepoxides and higher epoxides are especially preferred. These polyepoxides are nonphenolic and are obtained by epoxidation of the olefinic compound by oxygen and selected metal catalysts, by perbenzoic acid, by acetaldehyde monoperacetate, or by peracetic acid.

Epoxy-containing polyesters are produced from the foregoing preformed esterification products and polyepoxides by reacting at least about 1 mole of the polyepoxide with each unreacted carboxyl equivalent in the esterification product. The reaction generally requires elevated temperatures, but the specific temperature required varies with the particular reactants employed. The temperature should be sufficiently high so as to cause reaction of the epoxy groups in the polyepoxide with the unesterified carboxyl groups in the esterification product at an appreciable rate. The temperature should not be high enough, however, to cause substantial further esterification of the preformed esterification product, although in many cases some additional esterification can be tolerated. In most instances, the temperature of reaction is between about 250° F. and 500° F.

In order to illustrate a manner of producing the epoxy-containing polyesters, there is given below a detailed example of the preparation of a preferred embodiment of the polyesters employed in the invention.

Example H

A reaction vessel is charged with 1929 parts of adipic acid, 214 parts of azaleic acid and 1479 parts of 1,4-butanediol. This mixture is heated to 440° F. and held at that temperature for 3 hours while removing the water of reaction. The esterification product thus produced has an acid number of 19.0. There are added 300 parts of 3,4-epoxy-6-methylcyclohexylmethyl-3,4-epoxy-6-methylcyclohexanecarboxylate (Unox Epoxide 201) and this mixture is heated at 360° F. for about 5 hours. After the addition of 1083 parts of isopropyl acetate, the solution obtained has the following properties:

| | |
|---|---|
| Acid number | 2.2 |
| Hydroxyl value | 79.2 |
| Epoxide equivalent | 5700 |
| Solids content percent | 76.1 |

Other examples of epoxy-containing polyesters are produced by substituting in the above example various preformed esterification products and polyepoxides as set forth below.

Example I

The preformed esterification product of Example H is reacted with 400 parts of a polyepoxide from the reaction of Bisphenol A and epichlorohydrin, having an epoxide equivalent of 175 to 210 and an average molecule weight of 350 to 400. This polyepoxide is known as Epon 828. There may be employed instead, the similar polyepoxides known commercially as ERL-2774 and Epi-Rez 510. ERL-2774 has an epoxide equivalent of 185 to 200 and an average molecular weight of 350–400, and Epi-Rez 510 has an epoxide equivalent of 180–200 and an average molecular weight of 350–400.

Example J

Example H is repeated, except that the preformed esterification product is made from 948 parts of 1,4-butanediol, 494 parts of trimethylolethane, 692 parts of isophthalic acid and 1141 parts of sebacic acid.

Example K

A mixture of 966 parts of coconut fatty acid, 74 parts of p-tertiary butyl benzoic acid, 1006 parts of trimethylolethane, 1187 parts of phthalic anhydride is heated with about 120 parts of xylene (as a reflux solvent) at 440° F. until the product has an acid number of 20. There are then added 321 parts of the polyepoxide employed in Example H and the mixture heated at 380° F. until the acid number is less than 4.

Example L

A preformed esterification product is made as in Example H, except that the reaction is stopped when the product has an acid number of 37. With this product there are reacted 600 parts of 3,4-epoxy-6-methylcyclohexylmethyl-3,4-epoxy-6 - methylcyclohexanecarboxylate. The epoxy-containing polyester obtained has nearly twice the number of unreacted 1,2-epoxy groups as that of Example H.

In addition to the above-described essential components, the composition may include pigments, solvents and other additive materials. Thus, for example, when the composition is to be employed as a primer, corrosion inhibiting pigments are often utilized.

To illustrate the manner of formulating the compositions of the invention, there is set forth below a detailed description of the production of a preferred composition of the class described:

A mixture of 5.5 parts of the polyepoxide ester of Example A above (as a 50 percent solution in equal parts of xylene and Cellosolve acetate), 6 parts of iron oxide pigment, and 6.5 parts of diacetone alcohol was ground in a pebble mill for 24 hours. There were then added an additional 11 parts of the polyepoxide ester solution and 2 parts of diacetone alcohol.

The pigment paste thus obtained was then blended with the following:

| | Parts by weight |
|---|---|
| Methyl methacrylate polymer from Example B (19 percent solution in diacetone alcohol) | 425 |
| Epoxy-containing polyester from Example H | 63 |
| Polyepoxide ester solution as above | 22 |
| Heat-reactive phenol-formaldehyde resin (known as Bakelite BKS-2600) [1] | 7.25 |
| Diacetone alcohol | 272 |

The coating composition thus obtained has a solids content of 20.2 percent and weighs 8.2 pounds per gallon.

In the composition just described, there may be substituted other polyepoxides, polymers of an alkyl methacrylate, and epoxy-containing polyesters such as those mentioned above, to produce coating compositions of the class described herein having varying properties. Thus, for example, in place of the polyepoxide ester of Example A, there can be used the commercial resins known as Epon 828, Epon 1004 made from Bisphenol A and epichlorohydrin, having an epoxide equivalent of 870 to 1025 and an average molecular weight of 1400, Epon 1007, Unox Epoxide 201, and the like. In place of the methyl methacrylate polymer of Example B, polymethyl methacrylate or the interpolymers of Examples B to G can be utilized. Similarly, the epoxy-containing polyesters of Examples J to L can be substituted for that of Example H, and other heat-reactive phenol-aldehyde resins can be used in place of BKS-2600. In each instance, coating compositions having desirable properties for various applications are obtained.

As indicated above, the compositions herein are particularly advantageous when used as primers under plastisols and as primers under adhesive bonded polyethylene. The foregoing composition when used in this manner is roller coated onto bright tin plate using a film weight of about 2.5 to 3 milligrams per square inch, and then baked for 10 minutes at 375° F. To this coated tin plate there may be applied a plastisol coating, which is then baked for 4 to 5 minutes at 375° F. The resulting coated metal has excellent properties and can be fabricated into, for example, bottle caps, without destroying the continuity of the film.

The foregoing tin plate having thereon the coating of the composition described above is also particularly suitable as the substrate for the application of polyethylene. The adhesive adheres well to the coated metal and the coated article may be fabricated and formed into various shapes.

According to the provisions of the patent statutes, there are described above the invention and what are now con-

---

[1] Unmodified phenolic resin solution in denatured alcohol, having a non-volatile content of 52 to 56 percent, a viscosity at 25° C. of 700 to 1000 centipoises, a specific gravity at 25° C. of 1.046 to 1.062, and weight per gallon of 8.72 to 8.85 pounds.

I claim:

1. A coating composition comprising (1) a member of the group consisting of polyepoxides having a 1,2-epoxy equivalency of greater than 1.0, monocarboxylic acid esters of said polyepoxides, and, mixtures thereof; (2) a heat-reactive phenol-aldehyde resin; (3) a polymer of an alkyl methacrylate; and (4) a polyester containing unreacted 1,2-epoxy groups in the polyester molecules.

2. A coating composition comprising (1) a member of the group consisting of polyglycidyl ethers of a polyhydric compound and monocarboxylic acid esters thereof; (2) a heat-reactive phenol-aldehyde resin; (3) a polymer of an alkyl methacrylate; and (4) a polyester containing unreacted 1,2-epoxy groups in the polyester molecules.

3. A coating composition comprising (1) a member of the group consisting of polyepoxides having a 1,2-epoxy equivalency of greater than 1.0, monocarboxylic acid esters of said polyepoxides, and mixtures thereof; (2) a heat-reactive phenol-aldehyde resin; (3) a polymer of an alkyl methacrylate; and (4) a polyester containing unreacted 1,2-epoxy groups in the polyester molecules, said polyester being the reaction product of a polyepoxide having a 1,2-epoxy equivalency of greater than 1.0 with a preformed esterification product of a polyhydric alcohol and a polycarboxylic acid, using at least about 1 mole of the polyepoxide per unreacted carboxyl equivalent in the preformed esterification product.

4. The composition of claim 3 in which the polyester is the reaction product of a polyepoxide produced by the epoxidation of an olefinically unsaturated compound.

5. The composition of claim 4 in which said olefinically unsaturated compound is an olefinically unsaturated alicyclic compound.

6. The composition of claim 4 in which the polyepoxide from which the polyester is produced is 3,4-epoxy-6-methylcyclohexylmethyl - 3,4 - epoxy - 6 - methylcyclohexane-carboxylate.

7. A coating composition comprising (1) a polyepoxide having a 1,2-epoxy equivalency of greater than 1.0; (2) a heat-reactive phenol-aldehyde resin; (3) a polymer of an alkyl methacrylate; and (4) a polyester containing unreacted 1,2-epoxy groups in the polyester molecules.

8. A coating composition comprising (1) a monocarboxylic acid ester of a polyepoxide having a 1,2-epoxy equivalency of greater than 1.0; (2) a heat-reactive phenolaldehyde resin; (3) a polymer of an alkyl methacrylate; and (4) a polyester containing unreacted 1,2-epoxy groups in the polyester molecules.

9. The composition of claim 8 in which said monocarboxylic acid is a fatty acid.

10. The composition of claim 8 in which said monocarboxylic acid ester is a fatty acid ester of a polyglycidyl ether of a polyhydric compound.

11. A coating composition comprising (1) a member of the group consisting of polyepoxides having a 1,2-epoxy equivalency of greater than 1.0, monocarboxylic acid esters of said polyepoxides, and mixtures thereof; (2) a heat-reactive phenol-aldehyde resin; (3) an interpolymer of an alkyl methacrylate and a minor proportion of at least one other ethylenically unsaturated monomer; and (4) a polyester containing unreacted 1,2-epoxy groups in the polyester molecules.

12. The composition of claim 11 in which said other monomer has the formula:

wherein R is a member of the group consisting of hydrogen and lower alkyl radicals and Z is selected from the class consisting of

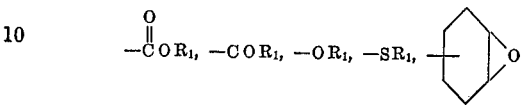

and

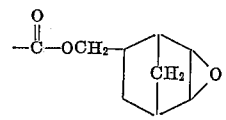

radicals, wherein $R_1$ represents at least one member of the group consisting of radicals derived by removing a hydroxyl group from the hydroxyl group of a polyol and radicals derived by removing the halogen atom from a halogen-substituted aliphatic epoxide.

13. The composition of claim 11 in which said interpolymer is an interpolymer of methyl methacrylate and glycidyl methacrylate.

14. A coating composition comprising (1) a member of the group consisting of polyglycidyl ethers of a polyhydric compound, having a 1,2-epoxy equivalency greater than 1.0, monocarboxylic acid esters of said polyepoxides, and mixtures thereof; (2) a heat-reactive phenol-aldehyde resin; (3) a polymer of methyl methacrylate; (4) a polyester containing unreacted 1,2-epoxy groups in the polyester molecules, said polyester being the reaction product of a polyepoxide having a 1,2-epoxy equivalency greater than 1.0 and a preformed esterification product of a polyhydric alcohol and a polycarboxylic acid.

15. A coating composition consisting essentially of (1) a member of the group consisting of polyepoxides having a 1,2-epoxy equivalency of greater than 1.0, monocarboxylic acid esters of said polyepoxides, and mixtures thereof; (2) a heat-reactive phenol-aldehyde resin; (3) a polymer of an alkyl methacrylate; and (4) from about 10 to about 50 percent by weight, based on the total composition, of a polyester containing unreacted 1,2-epoxy groups in the polyester molecules.

16. The composition of claim 15 in which said polymer of an alkyl methacrylate is present in an amount between about 20 and about 75 percent based on the total composition, and the phenol-aldehyde resin is about 10 to about 60 percent of the combined weight of the phenol-aldehyde resin, the polyepoxide and the ester thereof.

References Cited by the Examiner

UNITED STATES PATENTS 2,935,488   5/1960   Phillips et al. _____ 260—45.4
2,999,827   9/1961   McGary et al. _____ 260—23
3,011,909   12/1961  Hart et al. _____ 260—837

OTHER REFERENCES

Federation of Societies for Paint Tech., "Official Digest," vol. 35, No. 462, July 1963, p. 649 relied on.

LEON J. BERCOVITZ, *Primary Examiner.*